UNITED STATES PATENT OFFICE.

JOHN H. FITZGERALD, OF FRANKFORD, WEST VIRGINIA.

PLASTERING COMPOSITION.

SPECIFICATION forming part of Letters Patent No. 391,889, dated October 30, 1888.

Application filed May 8, 1888. Serial No. 273,248. (No specimens.)

*To all whom it may concern:*

Be it known that I, JOHN H. FITZGERALD, a citizen of the United States, residing at Frankford, in the county of Greenbrier and State of West Virginia, have invented certain new and useful Improvements in Plastering Compositions, of which the following is a specification.

My invention consists of an improved plastering composition which presents the advantages of being unaffected after standing for twelve or twenty-four hours by cold or heat, and of rendering buildings plastered with it more impervious to the variations of heat, cold, and moisture, of possessing a greater quantity of what is known among plasterers as "fat" or "slobber," and hence of being worked with greater ease and being put on more rapidly and cheaply, and of having but two coats, which can be worked in immediate succession, the first giving a smooth surface without "floating," and the second or skim coat being one with which joinings and facings can be made without leaving dark lines or markings or presenting the appearance of patchings. Through it tack-stains and nail-heads will not show. The first coat need not be more than one-half the usual thickness, and can be troweled down for painting, calcimining, or papering, thus saving the second or skim coat, unless a fine white finish is desired, which the second coat will give, and which can be put on, if need be, without waiting for the first coat to dry, and which will not rub off or crack, as some other compounds will do.

This compound can be put on and will adhere with tenacity to smooth wooden surfaces, iron, or glass. Openings may be cut through it without breaking it, and the necessity of patching be thus avoided, and it sets with sufficient rapidity to enable the carpenter to follow almost immediately after the plasterer. When mixed in the proportions given, it can be kept in any climate, and is ready for use by simply mixing with cold water.

My present invention relates to the composition for the first coat. The compound for this is composed of the following materials, which are mixed in the following proportions: Two and a half pounds of sand, one and a half pounds of moderately fine sawdust, four pounds of plaster-of-paris, four pounds of slaked lime, one-fourth of a pound of sugar, and eighty grains of carbonate of soda. The function of the several ingredients is as follows: The sand and lime form the body of the mortar. Sawdust also gives body, but its peculiar agency is to toughen the mortar, so that it will not be damaged by freezing and will be less subject to the influences of heat and cold. The plaster-of-paris is to give hardness and tenacity, and to secure quick setting and increase its adhering properties. The sugar retards the setting, which would take place too rapidly with plaster-of-paris alone. It also serves to increase the adhesion and hardness of the plaster. The soda is to lighten the mortar and make it work easily, and it also acts to retard the setting.

The composition herein described I contemplate using either by itself or as the first coat in connection with a second coat, the compound for which I have embodied in another application for a patent filed simultaneously herewith.

What I claim as new, and for which I desire to secure Letters Patent, is—

A plastering composition composed of sand, sawdust, plaster-of-paris, slaked lime, sugar, and carbonate of soda, in or about the proportions described.

JOHN H. FITZGERALD.

Witnesses:
JOHN W. HARRIS,
E. C. BEST.